Patented July 8, 1952

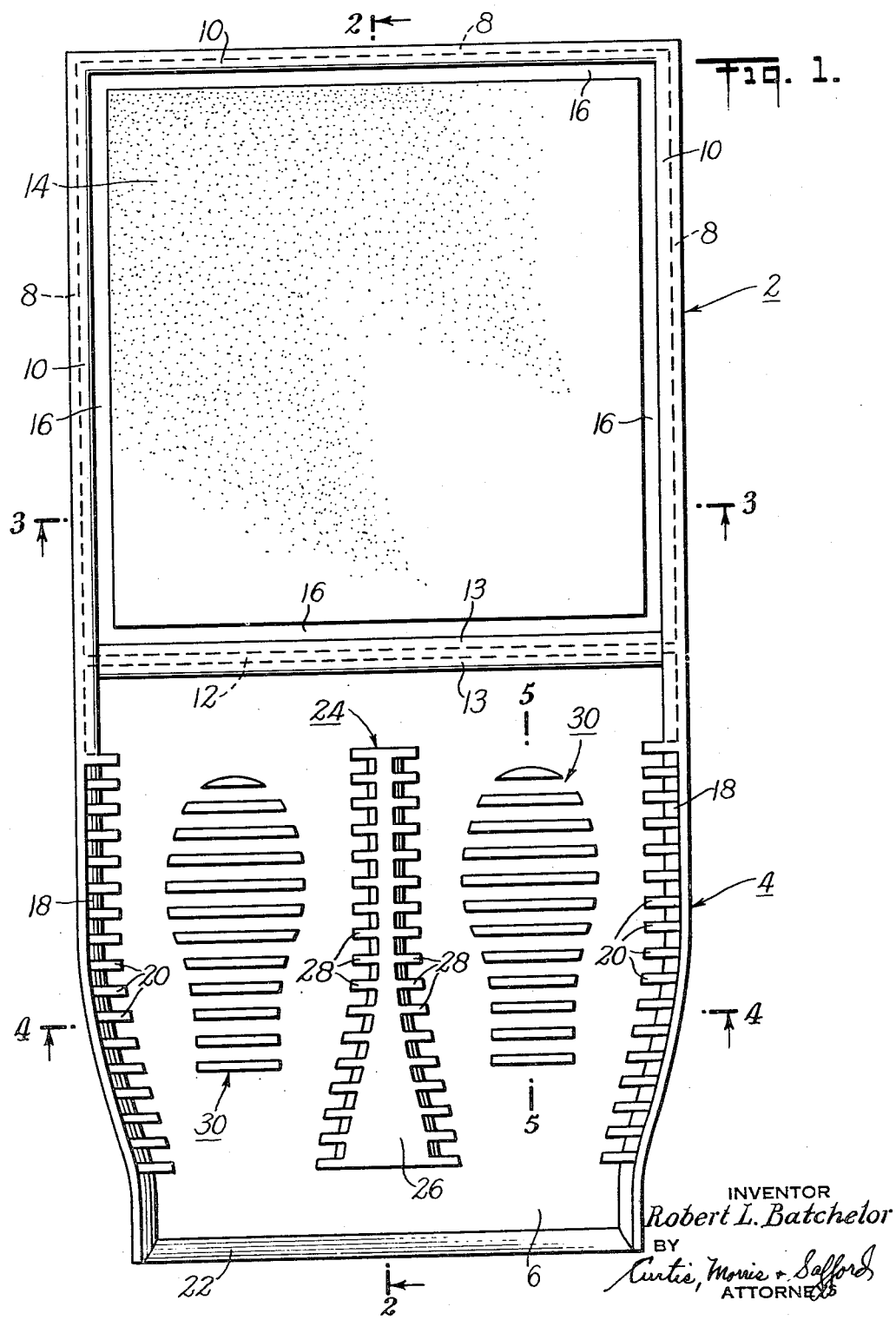

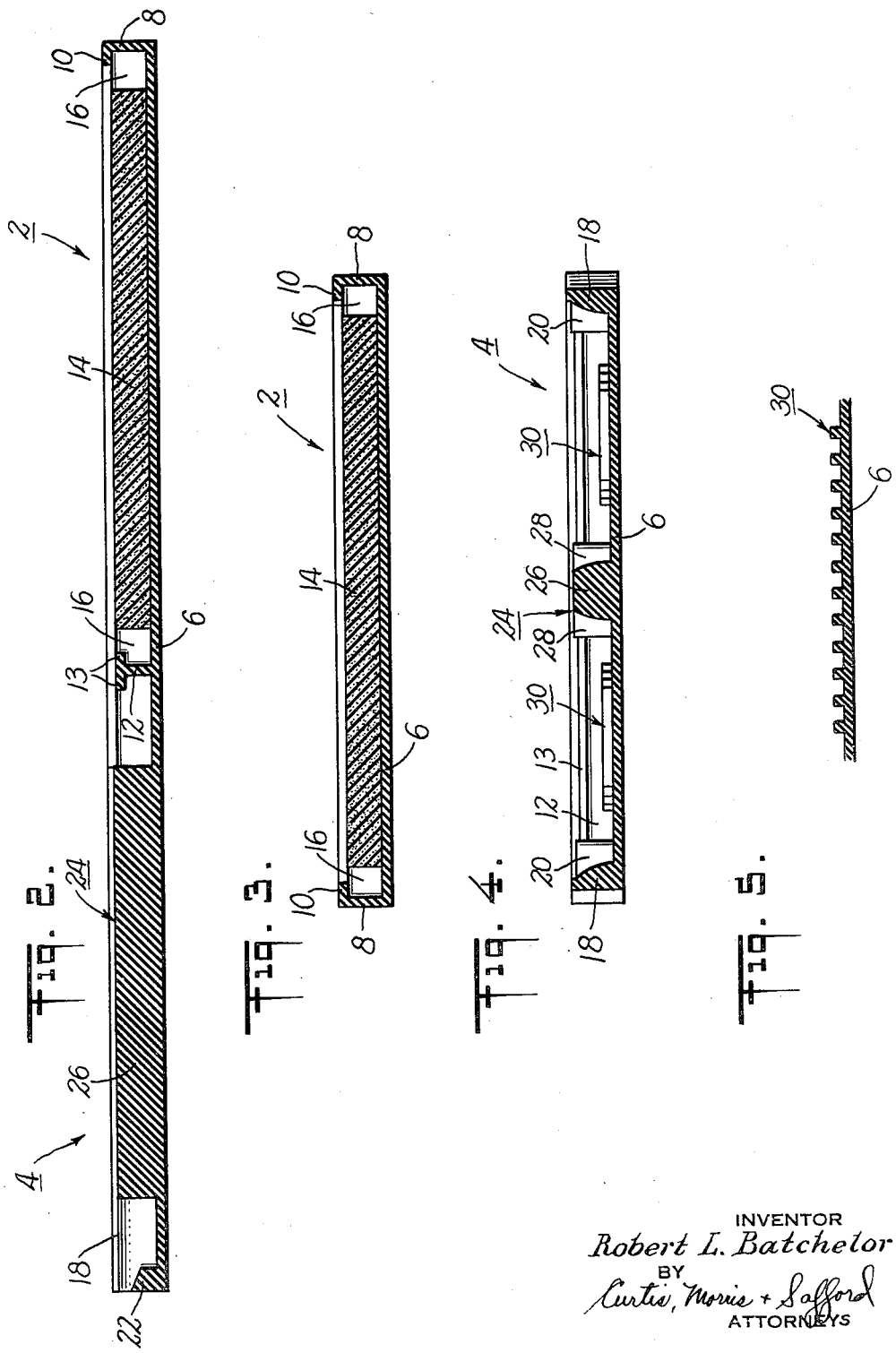

2,602,724

UNITED STATES PATENT OFFICE 2,602,724

SHOE CLEANING AND STERILIZING DEVICE

Robert L. Batchelor, Tenafly, N. J.

Application February 10, 1950, Serial No. 143,576

4 Claims. (Cl. 21—61)

This invention relates to sanitation, and more in particular to preventing the spread from one dairy herd to another of contamination such as diseases which can be spread by dirt which contains germs or bacteria organisms which clings to a person's shoes and then gets into the food of an undiseased cow.

On farms where cattle are kept great difficulty is encountered in protecting the cattle against various communicatable diseases. This is especially true with dairy cattle where the fresh milk enters the commercial market so that a diseased cow is a threat to the health of many people. It is common practice to test dairy cattle for various bovine diseases such as Bang's disease and tuberculosis, and the attendants of herds are always alert to the appearance of these and other diseases such as mastitis. Furthermore, in the past, hoof and mouth disease has been very serious in some sections and extra care must be taken to stop its spread. When one of these diseases is discovered by a test or otherwise, the diseased animal is isolated from its herd; and, when advisable, the entire herd is quarantined during a period necessary to determine that all other animals in the herd are free of the disease. In view of the seriousness of such diseases and the rapidity with which they spread within a herd, the inspection and testing is carried on at rather frequent intervals and in a routine manner. Much of the danger of spread of these diseases has been eliminated by taking precautions against any animal coming into contact with animals of other herds. However, in spite of this, the diseases sometimes continue to spread and it now appears advisable to take further precautions.

It has been determined that at least some contamination has been carried from one herd to another by dirt sticking to the shoes of such people as veterinarians, cattle dealers, board of health inspectors and dairy service men; and, then when these people pass from an infected farm to an uninfected one, the dirt drops from their feet and may get mixed into the cattle's feed with the result that the cattle eating it become infected. Therefore, a veterinarian or health inspector may become the agent for spreading the disease during the time that he is attempting to combat it.

While such people as those referred to above take all reasonable precautions against spreading diseases, including washing their hands and insuring that their clothing is clean after they leave each herd, it has been difficult to insure that the diseases will not be spread by dirt clinging to their shoes. It is a further object of the present invention to provide positive means for preventing the spread of diseases in the manner last referred to.

In accordance with the present invention, the shoes of each person entering the premises where a herd is kept is required to clean his shoes and simultaneously immerse the lower portions of them in a sterilizing solution. The sterilizing solution is of such a character that it kills the germs of all of the diseases such as those referred to above which are apt to be carried on the shoes; and, the solution also contains materials to keep it from freezing during the cold weather. The illustrative embodiment of this invention incorporates into a single tray structure, a foot-scraping compartment wherein all dirt may be scraped from the soles and lower portions of the shoe and the dirt and shoes are disinfected; and there is a second compartment where a substantial body of the solution is provided so that the shoes can be further cleaned and rinsed and more thoroughly disinfected. Fresh solution is added to the second compartment from time to time and it overflows into the shoe-scraping compartment from which it may escape.

Referring to the drawings in which is shown a device incorporating the invention:

Figure 1 is a top plan view of the device; and

Figures 2, 3, 4 and 5 are vertical sections respectively, on the lines 2—2, 3—3, 4—4 and 5—5 of Figure 1.

Referring particularly to Figure 1 of the drawings, a relatively rigid rubber structure is shown which is generally rectangular and has, in the upper portion of the figure, a main liquid compartment 2, and in the lower portion of the figure, an auxiliary liquid and scraping compartment 4. The device has a rectangular bottom wall 6 (see Figure 2) which is surrounded by a perpendicular wall structure including a side wall 8 extending around three sides of compartment 2. Wall 8 has a flange 10 at the top which overhangs the adjacent edges of compartment 2 (see also Figure 3). Compartments 2 and 4 are separated by a T-shaped vertical partition 12 (Figure 2), having overhanging flanges 13 at the top, the top surface of which is level with the bottom of flange 10. Fixed to the bottom wall 6 and centrally positioned within compartment 2 (see Figure 1) is a square sponge rubber pad 14. The thickness of pad 14 is such that its upper surface is at the bottom of flange 10 and the pad is smaller than compartment 2 in transverse dimensions so that a free space 16 is provided between each of its side edges and the adjacent side wall and flange.

Side wall 8 and its flange 10 extend beyond partition 12 for a short distance along the adjacent sides of compartment 4 where the flange terminates and the wall is thickened as shown in Figure 4 in the form of a relatively rigid upright wall 18. Integral with each of the walls 18 is a row of seventeen scraping ribs 20. As shown in the lower portion of Figure 1, walls 18 are curved toward each other so that compartment 4 narrows at the end opposite compartment 2. This end of the compartment is closed by a rather broad low wall 22 (see Figure 2), the upper edge of which is slanting and has a maximum heighth substantially below the top of partition 12. Centrally positioned between and parallel to walls 18 is a scraper structure 24 which (see Figure 4) is integral with the bottom wall 6. This scraper structure has a relatively rigid central core 26 with two rows of ribs 28 positioned respectively along its sides; these ribs are identical with ribs 28 and are correspondingly positioned as shown. Thus, two foot spaces are formed respectively between the two walls 18 and the scraper structure 24; thus, each foot space has at one side a row of the ribs 18 and at the other side a row of the ribs 28. Centrally positioned within each of these foot spaces is a set of bottom ribs indicated at 30 and comprising twelve parallel ribs integral with the bottom wall and of varying length as shown so as to approximate the outline of a shoe sole. Thus, foot spaces are provided for a person's two feet which are admirably suited for the scraping of the feet, as will be more fully described below.

During use, a disinfecting solution is poured into compartment 2 until this compartment is completely filled and the solution has run over partition 12 so as to fill compartment 4 substantially to the top of the end wall 22. During this operation, the sponge rubber pad 14 is flexed so that it absorbs a substantial portion of the solution. A person entering the premises steps into compartment 4 with his feet positioned in the foot spaces and with his weight supported on the ribs 30. He then rubs his feet on ribs 30 and the side ribs 18 and 20 until all of the dirt is loosened and drops into the bottom of the compartment where it is sterilized and does not get out onto the floor. He next steps onto the sponge rubber pad 14 in compartment 2 and the pad is compressed so that the soles of the shoes are totally immersed in the solution. The sponge rubber also tends to assist in freeing any dirt which remains on the shoes and the solution sterilizes the bottoms of the shoes and the adjacent portions of the side walls.

The tendency for the solution to rise due to the immersion of the shoes may cause it to overflow partition 12 into compartment 4, but flanges 10 tend to prevent slopping of the solution and also tend to divert the excess solution around the spaces 16 to and over partition 12. The flow of additional amounts of the solution into compartment 4 may cause this compartment to overflow so that the solution adjacent end wall 22 may flow over this wall and is discharged. The side walls 8 and 18 prevent discharge of the solution at the sides and, therefore, there is a general flow of the solution from compartment 2 over partition 12 and thence into compartment 4. This flow causes floating dirt to be discharged readily from the surface of the solution in compartment 2, and with the construction shown all of the dirt is collected and sterilized with the tendency being for it to remain on the bottom wall of compartment 4. Under some circumstances excess solution may overflow end wall 22 onto the floor but it should be noted that this is a controlled slow rate discharge and if any dirt is carried from the compartment this dirt has already been thoroughly sterilized. The compartments are cleaned periodically at which time the sterilized dirt is removed and fresh solution is added.

While the constituency of the disinfecting or sterilizing solution and its concentration may be varied in accordance with the necessity for protecting against the spread of certain specific diseases, a specific example of one solution will now be described. To forty-three (43) pounds of sodium chloride salt there is added six (6) pounds of trisodium phosphate and one (1) pound of ammonium quaternary compound. This is thoroughly mixed and then one-half (½) pound of the mixture is added to one (1) gallon of water to form slightly more than one (1) gallon of the disinfecting solution. With this concentration of salt the mixture will not freeze during normal cold weather. The ammonium quaternary compound is an effective disinfectant and in this concentration will sterilize all dirt which is subjected to its action. The trisodium phosphate is quite effective as a cleaning agent and assists materially in cleaning the dirt from the shoes, and it also promotes the action of the ammonium quaternary.

Under some circumstances certain features of the construction here shown may be modified or even omitted to meet certain requirements. Thus, for example, the overhanging flanges 10 and 13 may be omitted and the heighth and thickness of wall 8 may be increased. As many possible embodiments may be made of the mechanical features of the above invention and as the art herein described might be varied in various parts, all without departing from the scope of the invention, it is to be understood that all matter hereinabove set forth, or shown in the accompanying drawings is to be interpreted as illustrative and not in a limiting sense. The term "shoes" has been used herein in its broadest sense to indicate foot apparel and includes boots, rubbers, and the like. While the arrangements of the ribs as well as their widths and heighths here shown are optimum for certain particular sets of circumstances, it is understood that these characteristics may be varied. For example, the bottom ribs 30 permit a substantial space for the collection of dirt below their top edges, but it may be desirable to increase their heighth so that a greater volume of dirt can be collected and remain undisturbed during foot-scraping operations.

I claim:

1. In a device of the character described for removing dirt or the like from shoes and for sterilizing the dirt and the lower portions of the shoes, a unitary tray construction which has a bottom wall structure, upstanding side wall structures around the edges of said bottom wall structure to provide a liquid compartment for sterilizing solution, a partition structure dividing said liquid compartment into two compartments and constructed to permit the liquid to flow from one side thereof to the other without overflowing said side wall structure, and scraping means positioned on one side of said partition structure and so arranged that dirt may be scraped from the shoes and will drop into said compartment where it will settle and be sterilized, said compartment being adapted to contain clean sterilizing solution on the side of said partition structure opposite said scraping means whereby the shoes may be simultaneously rinsed and sterilized after the scraping operation has been completed.

2. A device as described in claim 1 wherein said scraping means includes two sets of bottom ribs integral with said bottom wall structure and adapted to have the shoe soles rest and be scraped thereon, and side ribs integral with said side wall structure and adapted to have the lower side portions of the shoes scraped thereon.

3. A device as described in claim 2 which includes a central scraping structure integral with said bottom wall structure and centrally positioned between said two sets of bottom ribs and comprising a central core, and two rows of side ribs positioned respectively along the two sides thereof.

4. A device as described in claim 3 wherein the bottom and side wall structures as well as the partition structure and the rib structures are a unitary construction of relatively rigid rubber, and a pad of sponge rubber which is adapted to absorb the clean solution and to be squeezed by stepping thereon.

ROBERT L. BATCHELOR.

REFERENCES CITED

The following references are of record in the file of this patent:

UNITED STATES PATENTS

| Number | Name | Date |
|---|---|---|
| 1,965,558 | Weirich | July 3, 1934 |
| 1,992,648 | Browne | Feb. 26, 1935 |
| 2,071,762 | Nickle | Feb. 23, 1937 |
| 2,282,672 | Nelson | May 12, 1942 |
| 2,295,504 | Shelton | Sept. 8, 1942 |

FOREIGN PATENTS

| Number | Country | Date |
|---|---|---|
| 505,429 | Great Britain | July 29, 1938 |